United States Patent
Yu et al.

(10) Patent No.: US 8,245,608 B2
(45) Date of Patent: Aug. 21, 2012

(54) METHOD FOR MAKING MOLD CORE

(75) Inventors: Tai-Cherng Yu, Taipei Hsien (TW);
Hung-Tsan Shen, Tu-Cheng (TW);
Da-Wei Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 323 days.

(21) Appl. No.: 12/756,117

(22) Filed: Apr. 7, 2010

(65) Prior Publication Data

US 2010/0294095 A1    Nov. 25, 2010

(30) Foreign Application Priority Data

May 19, 2009   (CN) .......................... 2009 1 0302432

(51) Int. Cl.
*B23B 3/00* (2006.01)
*B23B 1/00* (2006.01)
(52) U.S. Cl. ........................... 82/1.11; 82/118
(58) Field of Classification Search .............. 82/1.11, 82/123, 158, 161, 171, 118, 901; 425/412, 425/808; 264/2.7, 2.5, 31
See application file for complete search history.

(56) References Cited

U.S. PATENT DOCUMENTS

| | | | | |
|---|---|---|---|---|
| 2,990,574 | A * | 7/1961 | De Carle | 425/340 |
| 4,749,530 | A * | 6/1988 | Kunzler | 264/2.7 |
| 4,924,739 | A * | 5/1990 | Ademovic | 82/1.11 |
| 5,378,412 | A * | 1/1995 | Smith et al. | 264/2.1 |
| 6,555,029 | B1 * | 4/2003 | Ruscio et al. | 264/1.1 |
| 7,762,165 | B2 * | 7/2010 | Kimura | 82/1.11 |
| 7,860,594 | B2 * | 12/2010 | Andino et al. | 700/98 |
| 2004/0191353 | A1 * | 9/2004 | Togo et al. | 425/412 |
| 2010/0079725 | A1 * | 4/2010 | Davis et al. | 351/205 |

* cited by examiner

*Primary Examiner* — Will Fridie, Jr.
(74) *Attorney, Agent, or Firm* — Altis Law Group, Inc.

(57) ABSTRACT

A method for making a mold core for molding lenses of optical fiber connector, is provided. The method includes: providing a first fixture and a mold block, the first fixture defining a first cavity therein, a center of the first fixture located within the first cavity and deviated from a center of the first cavity; providing a lathe comprising a rotatable spindle and a drill bit aligning with the rotatable spindle; installing the blank in the first cavity of the first fixture, and mounting the first fixture to the spindle; machining a first mold cavity in the blank using the drill bit; reinstalling the blank in the first cavity by revolving the blank 180 degrees; and machining a second mold cavity in the blank using the drill bit, thereby obtaining a mold core having the first and the second mold cavities.

9 Claims, 13 Drawing Sheets

METHOD FOR MAKING MOLD CORE

BACKGROUND

1. Technical Field

The present disclosure relates to mold cores, and particularly to a method for making a mold core for molding lenses for use in, for example, optical fiber connectors.

2. Description of Related Art

Optical fiber connectors are widely used in optical fiber communication systems, for connecting pairs of optical fibers. Lenses have been proposed to be applied in the optical fiber connectors, for converging light from one optical fiber to the other. As the optical fibers are small, the lenses as well as the molds for molding the lenses are also required to be small.

As the molds are so small, it is difficult to machine the mold cavities to the ideal precision. Furthermore, when a lens array is needed in the optical fiber connector, a mold cavity array is needed in the mold core, thus increasing the difficulty in machining the mold core with the desired precision.

What is needed, therefore, is a method for making a mold core for molding lenses for use in, for example, optical fiber connectors, which can overcome the above shortcomings.

BRIEF DESCRIPTION OF THE DRAWINGS

Many aspects of the present method can be better understood with reference to the following drawings. The components in the drawings are not necessarily drawn to scale, the emphasis instead being placed upon clearly illustrating the principles of the present method. Moreover, in the drawings, like reference numerals designate corresponding parts throughout the several views.

DETAILED DESCRIPTION

The disclosure of the present method will now be described in detail below and with reference to the drawings.

Referring to FIGS. 1-13, an exemplary method for making a mold core 10 for molding lenses of optical fiber connector (not shown), in accordance with an embodiment is provided. In the present embodiment, the mold core 10 has a mold cavity array including four mold cavities 12, 13, 14 and 15 formed in the molding surface 110.

Figure 1:
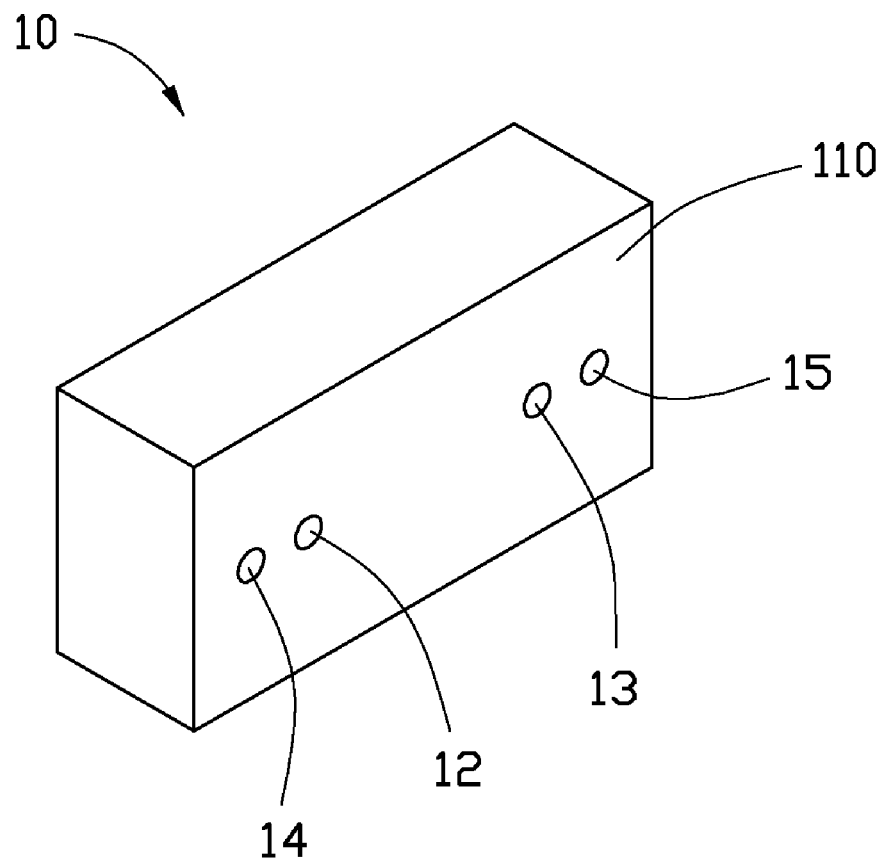
FIG. 1 is an isometric view of a mold core for molding lenses of optical fiber connector, in accordance with an embodiment.
Figure 2:
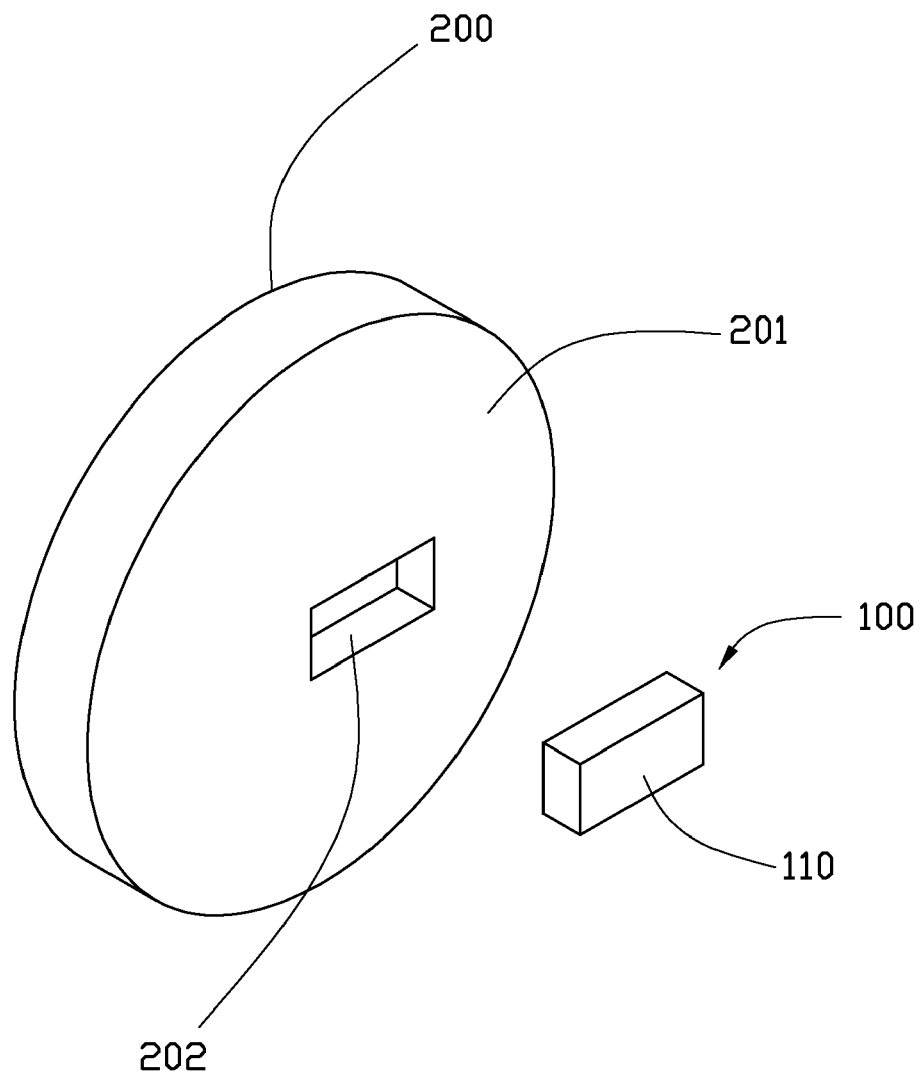
FIG. 2 is an isometric view of a first fixture and a blank, the first fixture defining a cavity for receiving the blank.
Figure 3:
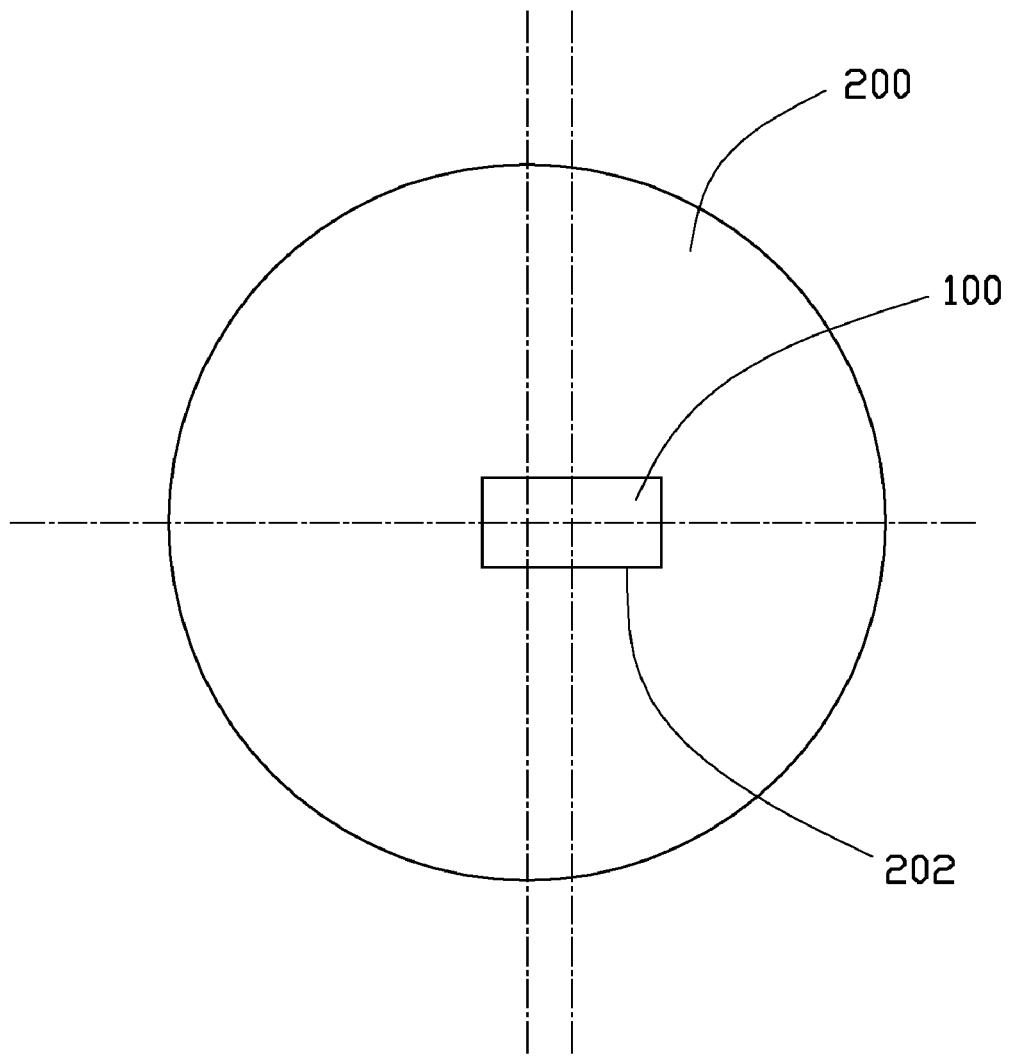
FIG. 3 is a plane view showing the blank is installed in the cavity of the first fixture shown in FIG. 2.

Referring to FIGS. 2 and 3, firstly, a blank 100 and a first fixture 200 are provided. The blank 100 can be made of metallic or plastic material. The blank 100 defines a molding surface 110. The first fixture 200 is circular, and defines a first cavity 202 in a surface 201 thereof. The first cavity 202 is configured for snugly receiving the blank 100, such that when the blank 100 is installed in the first cavity 202, a center of the blank 100 is aligned with a center of the first cavity 202. A center of the first fixture 200 is located within the first cavity 202, and the center of the first cavity 202 is deviated from the center of the first fixture 200 (see dashed line in FIG. 3).

Figure 4:
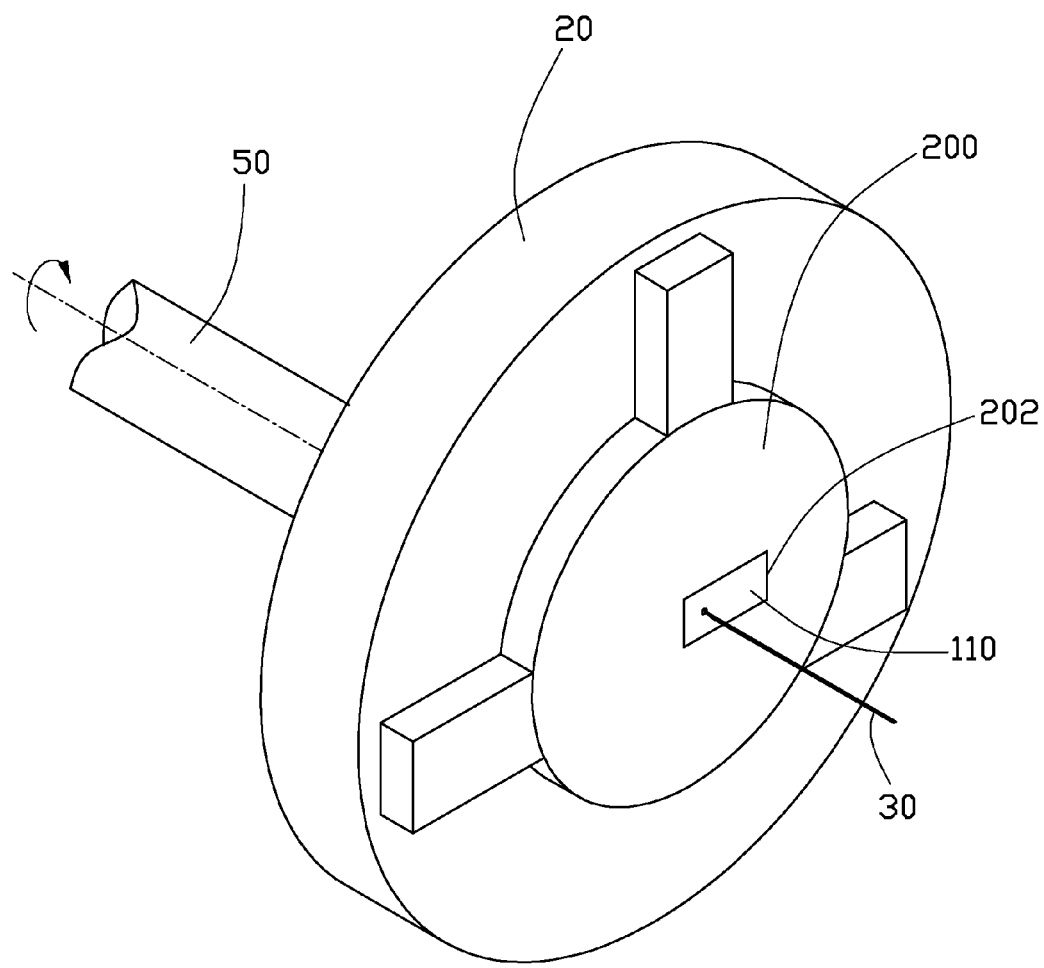
FIG. 4 is an isometric view of a spindle, a chuck and a drill bit of a lathe for machining the mold cavities in the blank shown in FIG. 3, the drill bit being drilling a first mold cavity.

Referring to FIG. 4, secondly, a rotatable spindle 50, a chuck 20 and a drill bit 30 of a lathe are provided. The chuck 20 is mounted to an end of the spindle 50, and configured for holding the first fixture 200, with a center of the first fixture 200 aligned with a center of the spindle 50 and a center of the chuck 20. The drill bit 30 can have a tip made of diamond, and can be controlled to be aligned with a central axis of the spindle 50 by a positioning system of the lathe (not shown). The size of the drill bit 30 is chosen according to need and may be very small such as 1 millimeter to form mold cavities of a very precise size.

After the blank 100 is installed in the first cavity 202 and the first fixture 200 is held by the chuck 20, the spindle 50 can be driven to rotate, thus rotating the blank 100 and one or both of the drill bit 30 and the blank 100 are moved to drill the current mold cavity.

Figure 5:
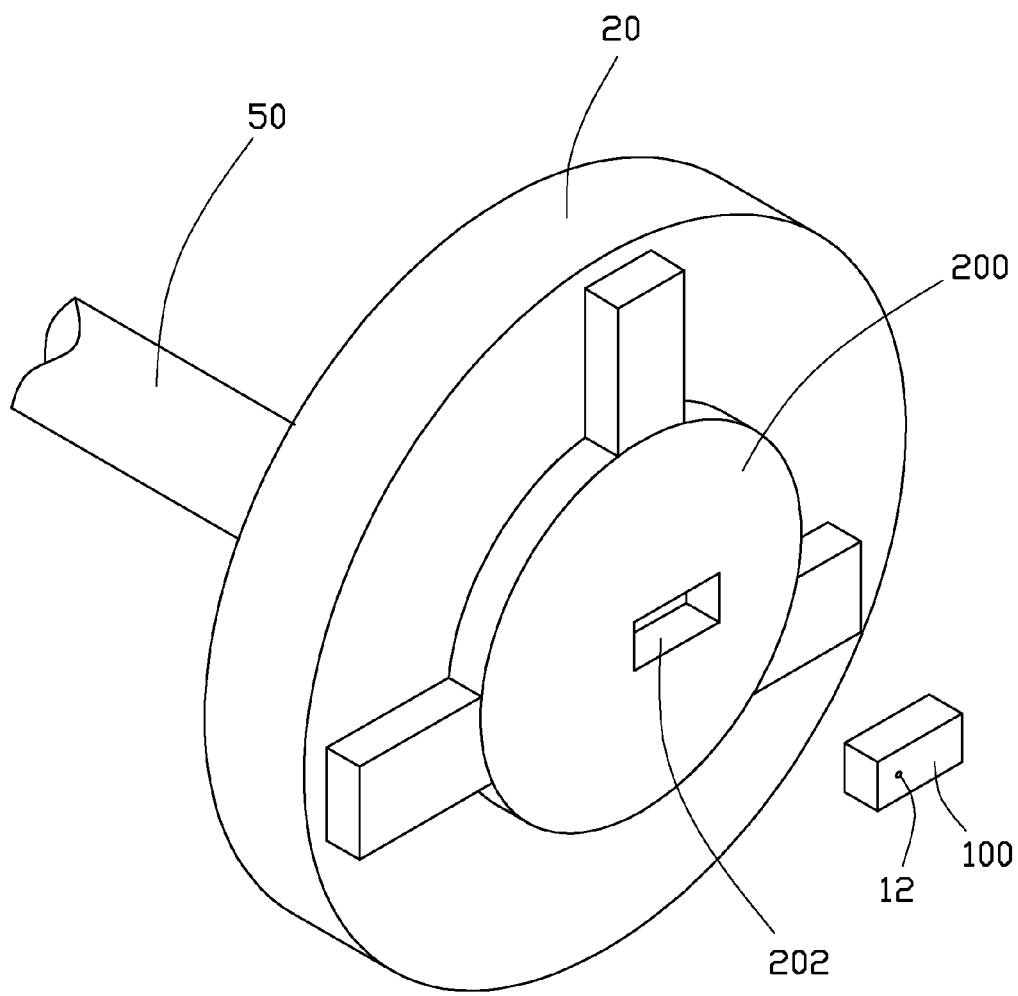
FIG. 5 is an isometric view showing the first mold cavity is finished, and the blank is uninstalled from the cavity of the first fixture shown in FIG. 4.

Referring to FIG. 5, the first mold cavity 12 is finished, and the blank 100 is uninstalled from the first cavity 202 of the first fixture 200.

Figure 6:
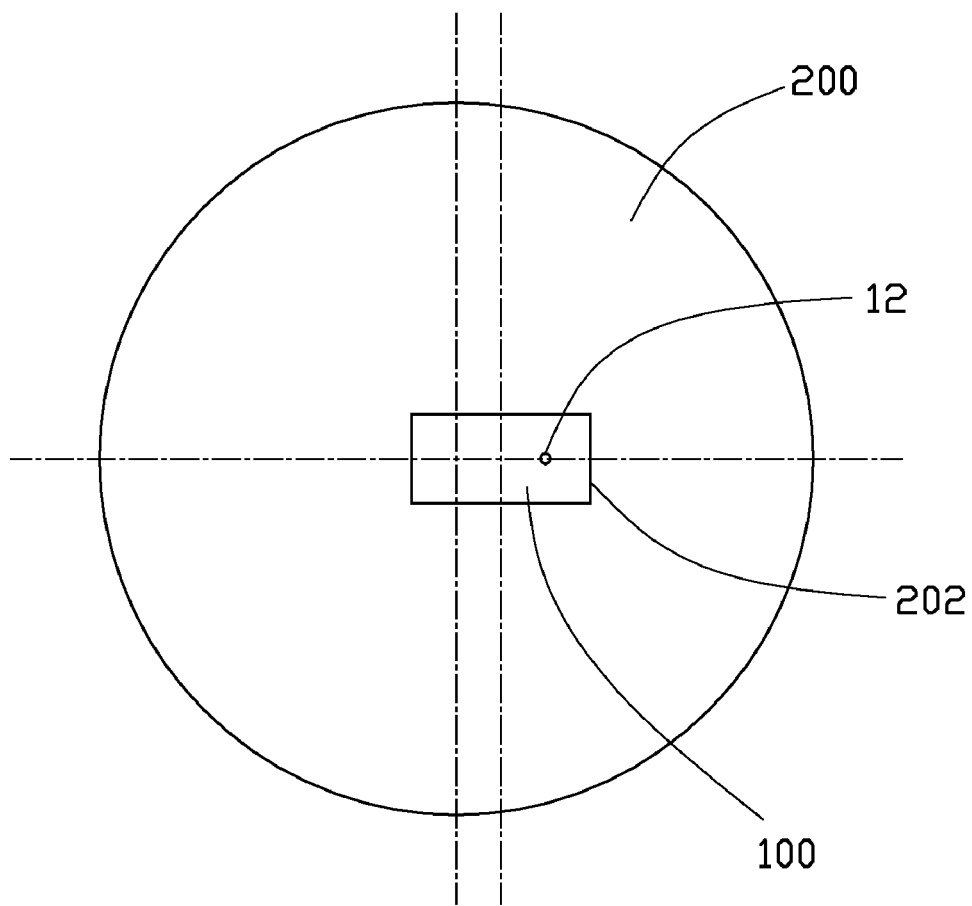
FIG. 6 is a plane view showing the mold block is revolved 180 degrees, and is reinstalled in the cavity of the first fixture shown in FIG. 5.
Figure 7:
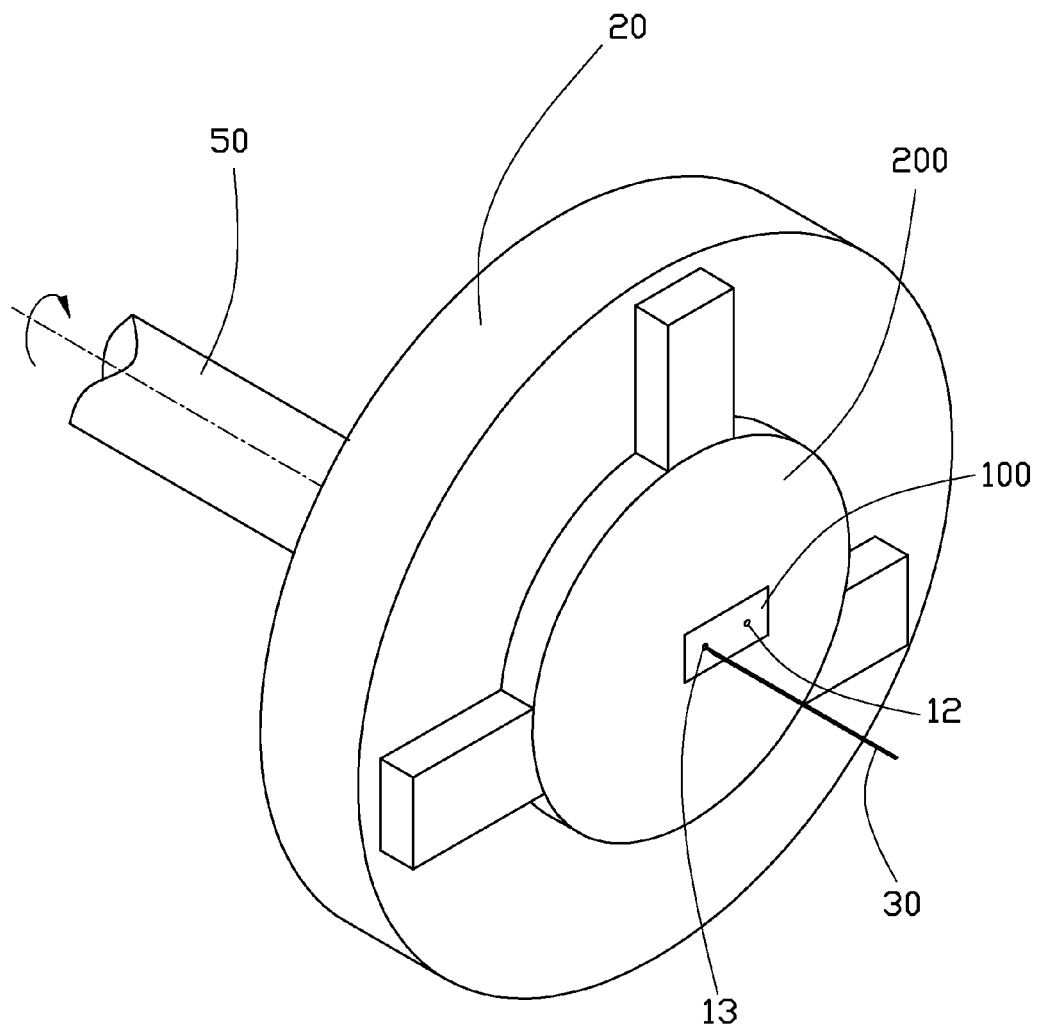
FIG. 7 is an isometric view showing the drill bit is drilling a second mold cavity in the blank shown in FIG. 6.

Referring to FIGS. 6 and 7, the blank 100 is revolved 180 degrees and is reinstalled in the first cavity 202 of the first fixture 200. Then the drill bit 30 is again aligned with the central axis of the spindle 50, and drills the molding surface 110 of the blank 100 while the blank 100 is rotated.

Figure 8:
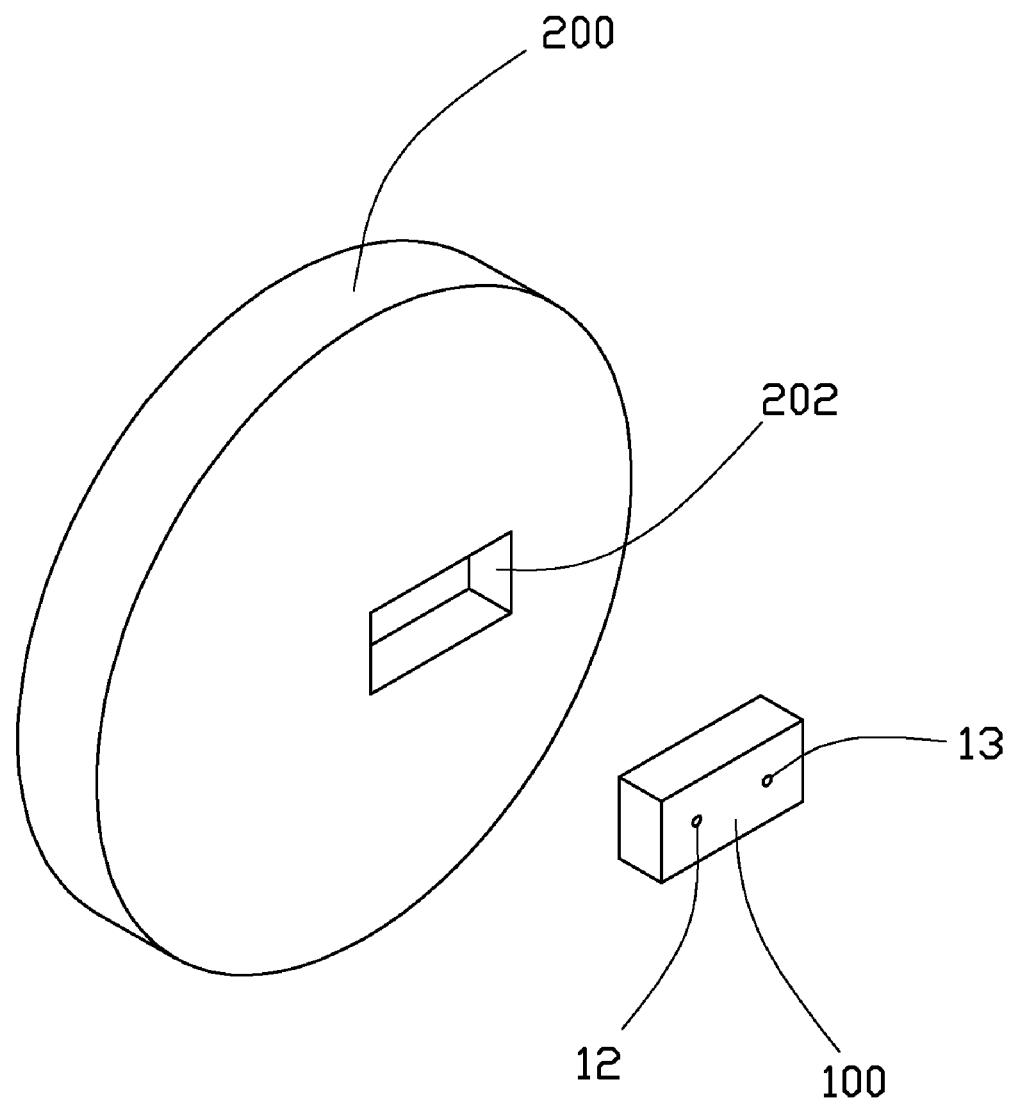
FIG. 8 is an isometric view showing the second mold cavity is finished, the blank is uninstalled from the cavity of the first fixture, and the first fixture is uninstalled from the chuck shown in FIG. 7.

Referring to FIG. 8, the second mold cavity 13, which is symmetrical with the first mold cavity 12 about the center of the blank 100 is finished. The blank 100 is uninstalled from the first cavity 202 of the first fixture 200, and the first fixture 200 is uninstalled from the chuck 20.

Figure 9:
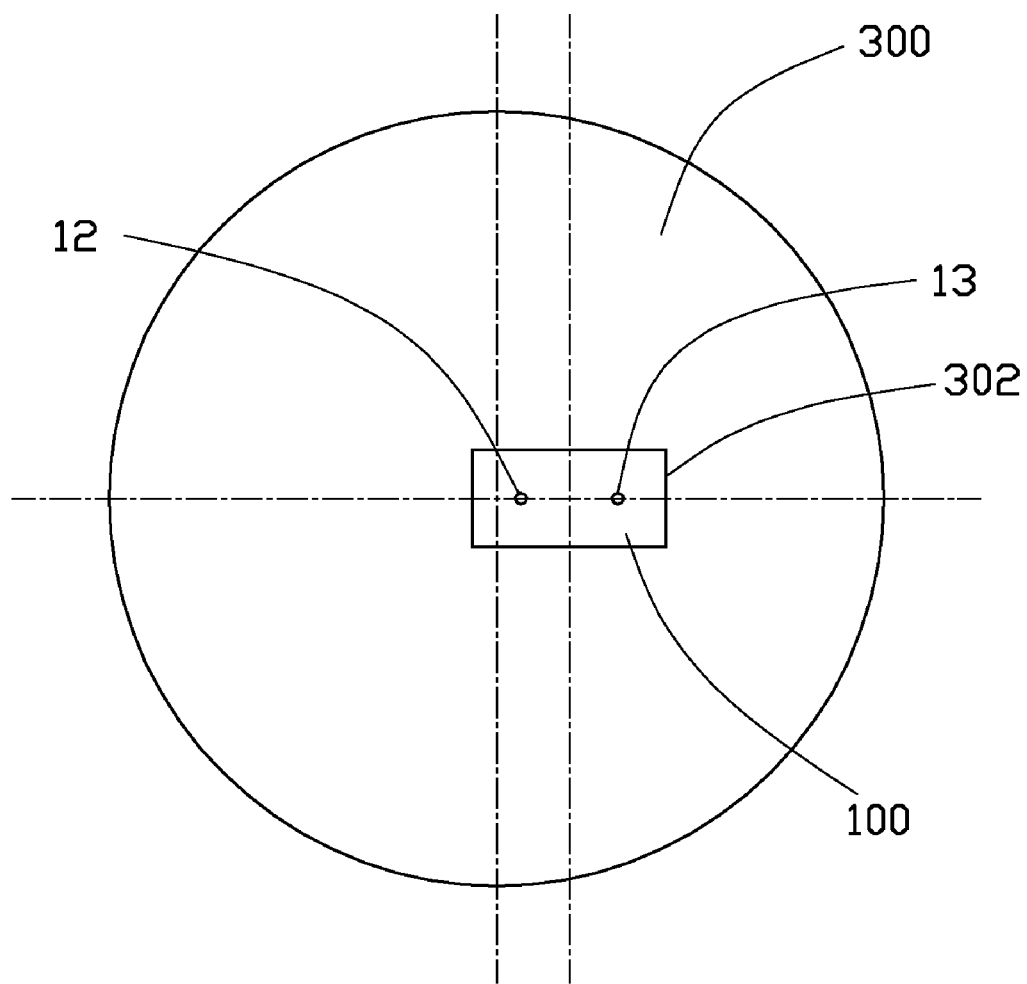
FIG. 9 is a plan view showing a second fixture is provided, the second fixture defining a cavity therein, and the blank of FIG. 8 being installed in the cavity of the second fixture.
Figure 10:
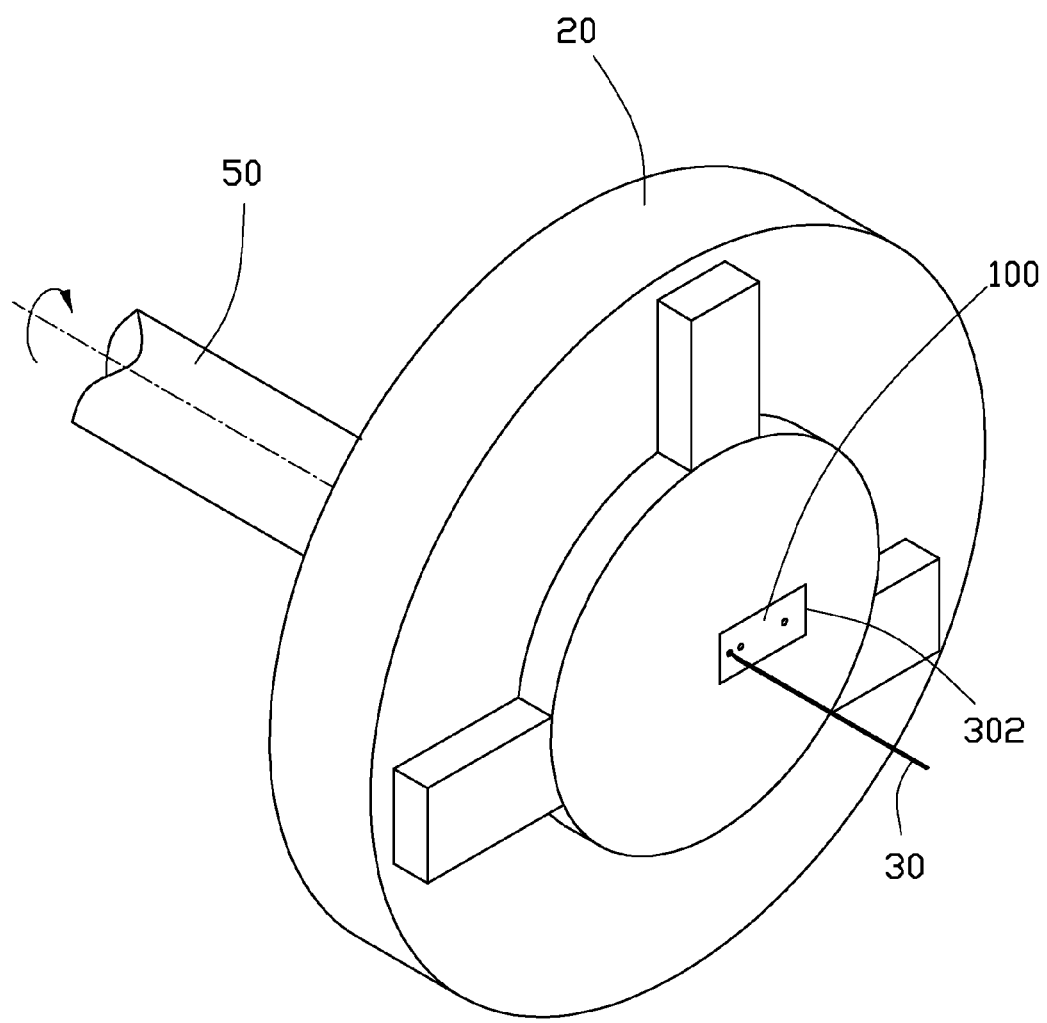
FIG. 10 is an isometric view showing the drill bit is drilling a third mold cavity in the blank shown in FIG. 9.

Referring to FIGS. 9 and 10, a second fixture 300 is provided. The second fixture 300 is also circular, and defines a second cavity 302 in a surface thereof. The second cavity 302 is also configured for snugly receiving the blank 100, such that when the blank 100 is installed in the second cavity 302, a center of the blank 100 is aligned with a center of the second cavity 302. A center of the second fixture 300 is located within the second cavity 302, and the center of the second fixture 300 is deviated from the center of the second cavity 302 (see dashed line in FIG. 3) and is deviated from the first and second mold cavities 12, 13. In the present embodiment, a distance maintained between the center of the second cavity 302 and the center of the second fixture 300 (also the center of the spindle 50) is greater than a distance maintained between the center of the first cavity 202 and the center of the fixture 200 (also the center of the spindle 50). The difference between the distances is less than 1.2 millimeters.

After the blank 100 is installed in the second cavity 302 and the second fixture 300 is held by the chuck 20, the spindle 50 can be driven to rotate, thus rotating the blank 100. Then, the drill bit 30 is again aligned with the central axis of the spindle 50, and drills the molding surface 110 of the blank 100 while the blank 100 is rotated.

Figure 11:
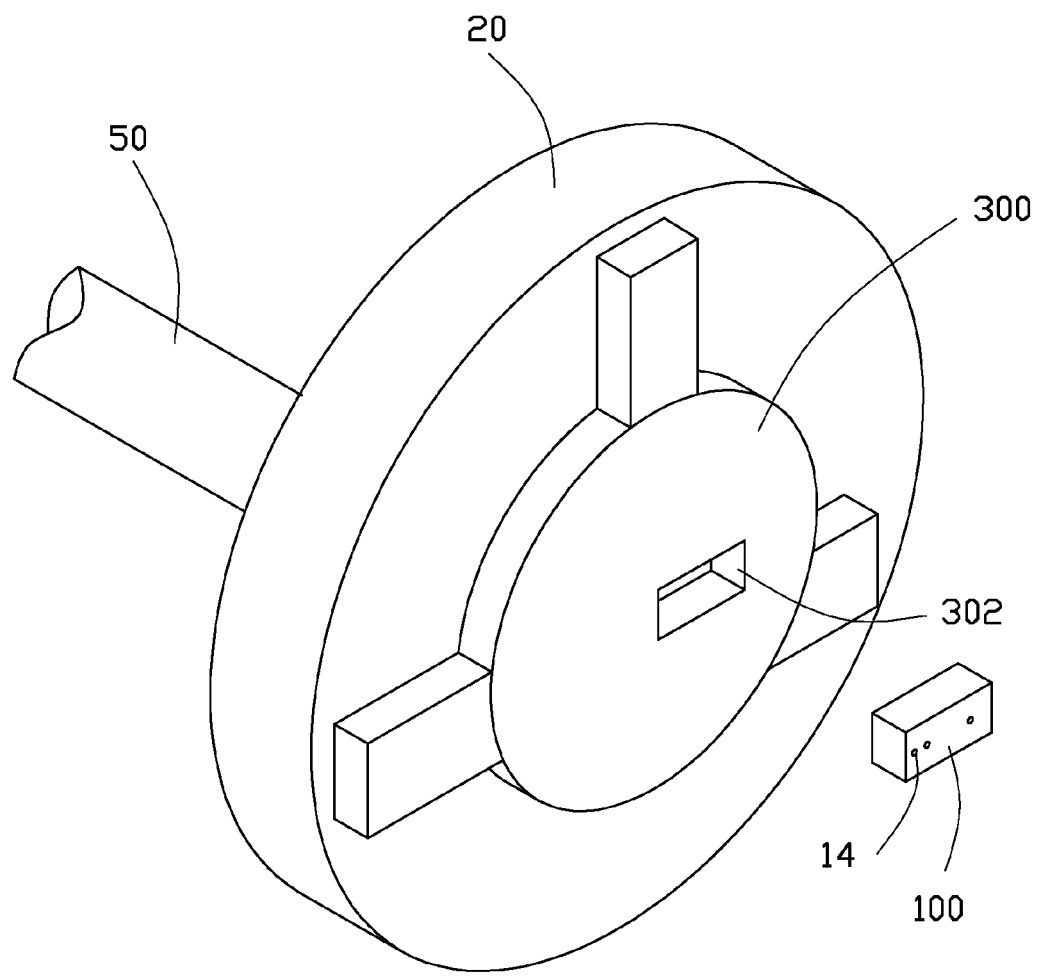
FIG. 11 is an isometric view showing the third mold cavity is finished, and the mold block is uninstalled from the cavity of the second fixture shown in FIG. 10.

Referring to FIG. 11, the third mold cavity 14 is finished, and the blank 100 is uninstalled from the second cavity 302 of the second fixture 300.

Figure 12:
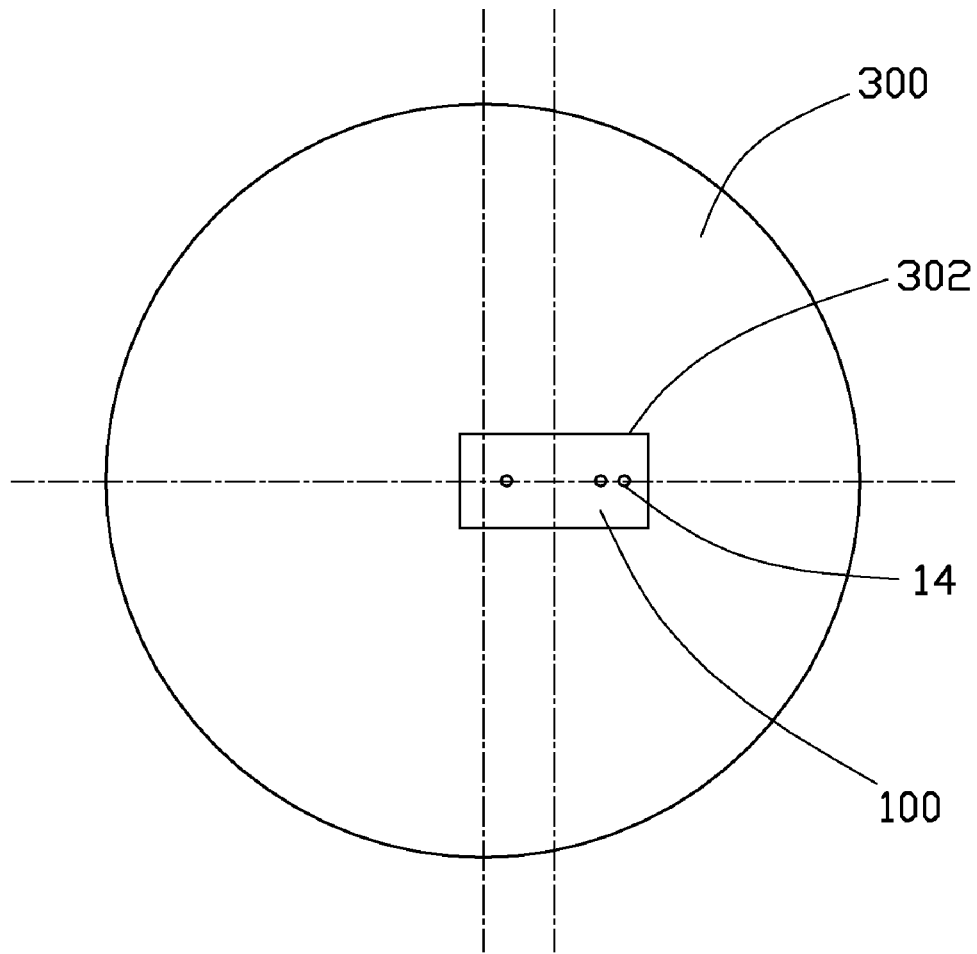
FIG. 12 is a plan view showing the mold block is revolved 180 degrees, and is reinstalled in the cavity of the second fixture shown in FIG. 11.
Figure 13:
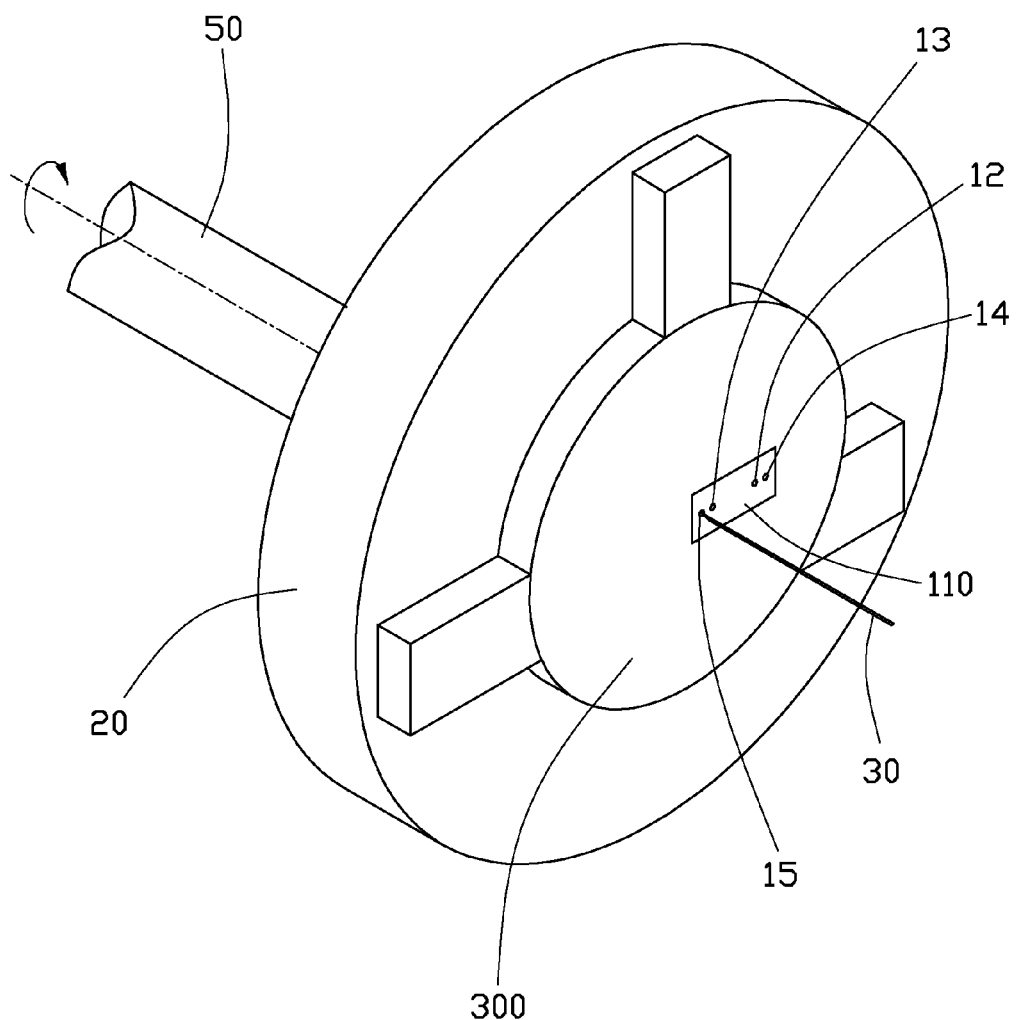
FIG. 13 is an isometric view showing the drill bit is drilling a fourth mold cavity in the blank shown in FIG. 12.

Referring to FIGS. 12 and 13, the blank 100 is revolved 180 degree and is reinstalled in the second cavity 302 of the second fixture 300. Then the drill bit 30 is again aligned with the central axis of the spindle 50, and drills the molding surface 110 of the blank 100 while the blank 100 is rotated. In this way, the fourth mold cavity 15, which is symmetrical with the third mold cavity 14 about the center of the blank 100 can be finished.

With the above-described method, positions of mold cavities are aligned with spindle 50, and the drill bit 30 is aligned with the spindle 50, as such, the mold cavities can be accurately formed. Due to the symmetry of the method, a mold cavity array can be quickly formed with high precision.

It is understood that the drill bit 30 can be replaced by other machining tools, such as cutting tools of the lathe according to need.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A method for making a mold core for molding lenses, the method comprising:
   providing a first fixture and a mold block, the first fixture defining a first cavity therein, a center of the first fixture located within the first cavity and deviated from a center of the first cavity;
   providing a lathe comprising a rotatable spindle and a drill bit aligning with the rotatable spindle;
   installing the blank in the first cavity of the first fixture with a center of the blank aligning with the center of the first cavity, and mounting the first fixture to the spindle with the center of the first fixture aligning with a center of the spindle;
   machining a first mold cavity in the blank using the drill bit while rotating the first fixture together with the mold block;
   uninstalling the blank from the first cavity and reinstalling the blank in the first cavity by revolving the blank 180 degrees; and
   machining a second mold cavity in the blank using the drill bit while rotating the first fixture together with the mold block, thereby obtaining a mold core having the first and the second mold cavities.

2. The method as described in claim 1, further comprising steps of:
   providing a second fixture defining a second cavity therein, a center of the second fixture located within the second cavity and deviated from a center of the second cavity and the first and second mold cavities;
   installing the blank in the second cavity of the second fixture with a center of the blank aligning with the center of the second cavity, and mounting the second fixture to the spindle with the center of the second fixture aligning with the center of the spindle; and
   machining a third mold cavity in the blank using the drill bit while rotating the second fixture together with the mold block, thereby obtaining a mold core having the first, the second and the third mold cavities.

3. The method as described in claim 2, further comprising steps of:
   uninstalling the blank from the second cavity and reinstalling the blank in the second cavity by revolving the blank 180 degree; and
   machining a fourth mold cavity in the blank using the drill bit while rotating the second fixture together with the mold block, thereby obtaining a mold core having the first, the second, the third and the fourth mold cavities.

4. The method as described in claim 3, wherein a distance maintained between the center of the second cavity and the center of the second fixture is greater than a distance between the center of the first cavity and the center of the first fixture.

5. The method as described in claim 4, wherein the difference between the distances is less than 1.2 millimeters.

6. The method as described in claim 5, wherein a diameter of an intimate end of the drill bit to the blank is not greater than 1 millimeter.

7. The method as described in claim 2, wherein the lathe further comprises a chuck mounted to an end of the spindle, and the chuck is configured for holding the first and second fixtures.

8. A method for making a mold core for molding lenses, the method comprising:
   providing a first fixture and a mold block, the first fixture defining a first cavity therein, a center of the first fixture located within the first cavity and deviated from a center of the first cavity;
   providing a lathe comprising a rotatable spindle and a machining tool;
   installing the blank in the first cavity of the first fixture with a center of the blank aligning with the center of the first cavity, and connecting the first fixture to the spindle with the center of the first fixture aligning with a central axis of the spindle;
   machining a first mold cavity in the blank using the machining tool by aligning the machining tool with the central axis of the spindle while rotating the first fixture together with the mold block;
   uninstalling the blank from the first cavity and reinstalling the blank in the first cavity by revolving the blank 180 degrees;
   machining a second mold cavity in the blank using the machining tool by aligning the machining tool with the central axis of the spindle while rotating the first fixture together with the mold block, thereby obtaining a mold core having the first and the second mold cavities;
   uninstalling the blank from the first cavity and uninstalling the first fixture from the spindle;
   providing a second fixture defining a second cavity therein, a center of the second fixture located within the second cavity and deviated from a center of the second cavity and the first and second mold cavities;
   installing the blank in the second cavity of the second fixture with a center of the blank aligning with the center of the second recess, and connecting the second fixture to the spindle with the center of the second fixture aligning with the central axis of the spindle; and
   machining a third mold cavity in the blank using the machining tool by aligning the machining tool with the central axis of the spindle while rotating the second fixture together with the mold block, thereby obtaining a mold core having the first, the second and the third mold cavities.

9. The method as described in claim 8, wherein the lathe further comprises a chuck mounted to an end of the spindle, and the chuck is configured for holding the first and second fixtures.

* * * * *